Feb. 16, 1960   A. L. DUNN ET AL   2,925,233
AIRCRAFT WING FOLD SYSTEM
Filed Feb. 18, 1957

INVENTORS.
Albert L. Dunn
John H. Quinn, Jr.
Robert W. Stoner

BY J. H. Nichols

AGENT

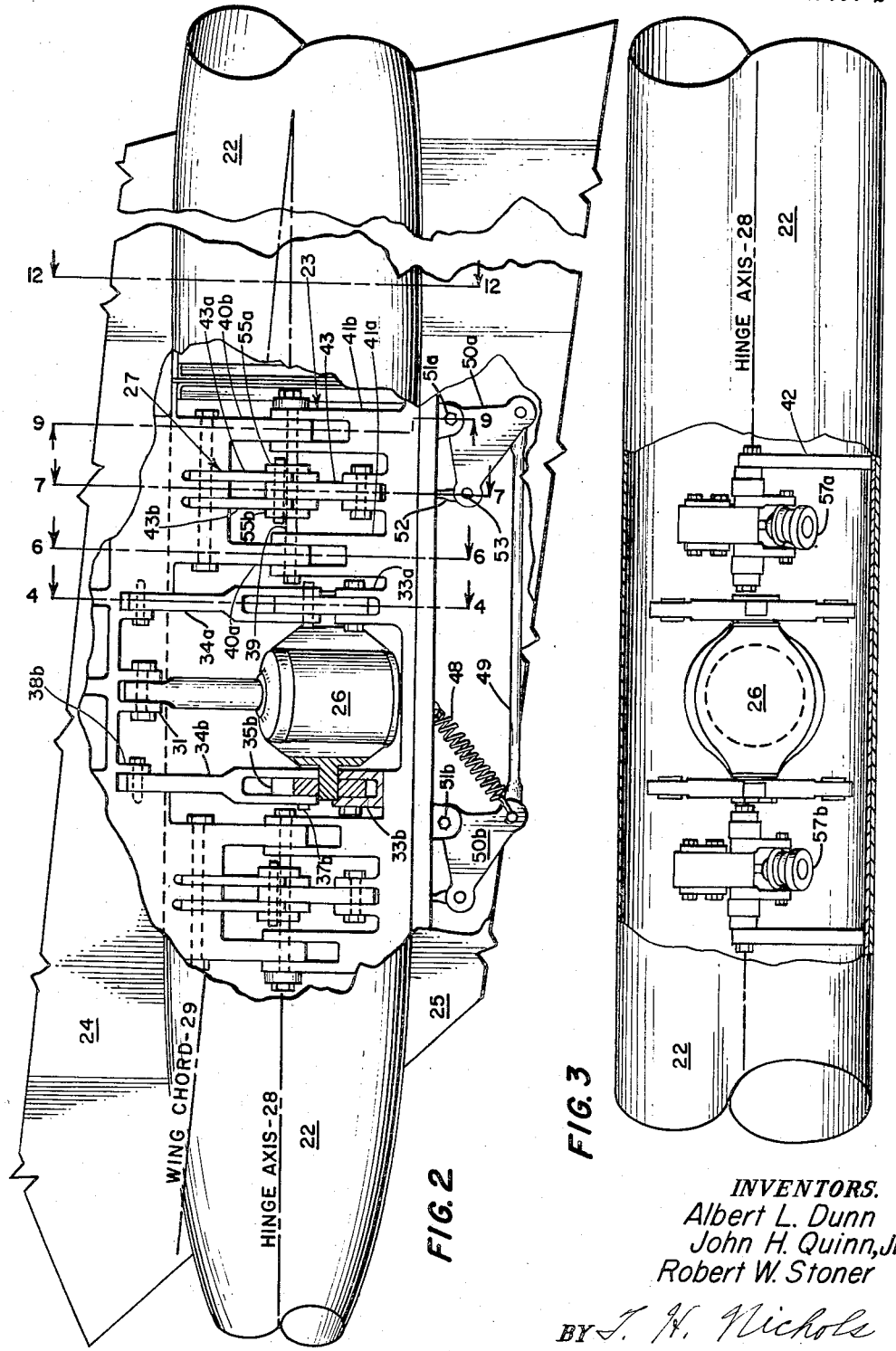

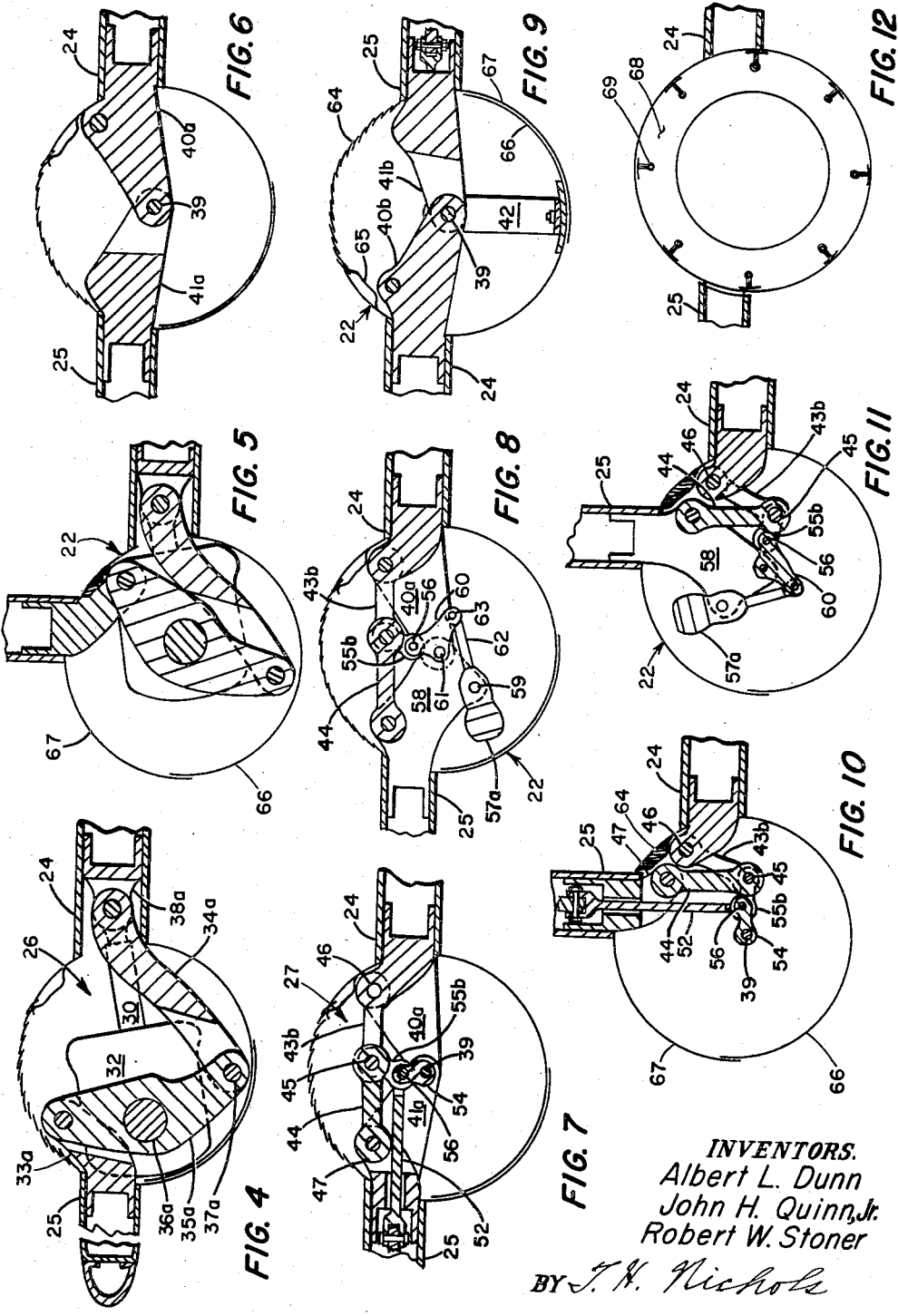

United States Patent Office 2,925,233
Patented Feb. 16, 1960

2,925,233

AIRCRAFT WING FOLD SYSTEM

Albert L. Dunn, John H. Quinn, Jr., and Robert W. Stoner, Dallas, Tex., assignors to Chance Vought Aircraft, Incorporated, Dallas, Tex., a corporation of Delaware Application February 18, 1957, Serial No. 640,762

5 Claims. (Cl. 244—43)

This invention relates to a high-speed aircraft wing that is lighter than conventional wings, and yet is strong enough to permit high-speed flight and normal maneuvers, as well as to withstand fast and violent maneuvers involving high structural moments and loads, as forces of 3 "g" (three times the force of gravity) and over. More specifically, the disclosed invention includes a light-weight hingedly interconnected two-part wing having in-flight wing folding and locking mechanisms enclosed in a fairing pod to provide for folding a large part of the wing to a vertical position for decreasing the high structural bending moments and loads at the wing roots for violent maneuvering.

As is well known in aircraft wings, as the wing span is increased, the wing becomes aerodynamically more efficient which is particularly useful for long range cruising. However, as the wing span is increased, the weight of the wing must be increased to provide sufficient structural strength. Likewise, with reduction of thickness of an aircraft wing, the velocity range in which the wing will operate efficiently is increased to make a high-speed wing. Nevertheless, as the wing thickness is decreased, the weight of the wing again must be increased to provide sufficient structural strength. Accordingly, in order that the conventional wing have a span great enough to provide efficient long range subsonic cruising, and to be thin enough for operation at high speeds, the strength necessary to be built into the wing to withstand the forces incurred in violent maneuvers as forces greater than 3 "g" for example requires a heavy wing and accordingly a high weight penalty results.

Herebefore a compromise has always been necessary in the design of the wings for high-speed aircraft between utilizing a high aspect ratio wing and a low aspect ratio wing. The wing having a high aspect ratio is a more efficient wing, but weight increases with increase in aspect ratio in order to retain the structural strength. The low aspect ratio wing is strong and light, but the aerodynamic efficiency is very low. Also a compromise has to be resolved between the use of a thick wing and a thin wing, the former being a light wing, but it is a low-speed wing, and the latter is a high speed wing, but it is heavy.

Accordingly, it is a primary object of this invention in an aircraft having high-speed low-drag light thin high aspect ratio wings to retain the advantages of the long thin wings and to provide a means which serves efficaciously to eliminate the disadvantages thereof by reducing the structural bending moments at the roots of the long thin wings for fast and violent maneuvering of the aircraft under high gravitational loads and accordingly reducing the required wing weight.

Another object of this invention is to provide a hinge means for an aircraft having thin wings for rotatably mounting the outer wing portion on the inner wing portion about an axis at an angle to the wing chord or canted whereby the outer wing portion may be rotated during flight to a vertical position of zero lift.

Yet another object of this invention is to provide an aircraft having a thin wing with a light weight and strong mechanism for folding a substantial portion of the thin wing in flight about the canted axis from an extended position of high lift, speed, and efficiency in normal maneuvers to a folded vertical position of minimum drag, high efficiency, and low bending moments for high speed violent maneuvers, a locking mechanism for locking the wing in each of the two positions, and a streamlined pod on the wing including the folding and locking mechanisms.

Other objects and various advantages of the disclosed high speed, low bending moment aircraft wing having folding and locking mechanisms will be apparent from the following detailed description, together with the accompanying drawings, submitted for purposes of illustration only and not intended to define the scope of the invention, reference being had for that purpose of the subjoined claims.

In conventional aircraft having folding wings, the wings are constructed for folding while on the ground as shown in U.S. Patent No. 2,509,272 wherein there are no bending moments nor lifting forces, or so that the wing tip may be movable at low speeds as shown in U.S. Patent No. 2,397,526 to provide additional control in a "tailless" type of aircraft, or so that additional rudder control may be obtained for maneuvering the "rudderless" and "tailless" type of aircraft as disclosed in U.S. Patent No. 2,418,301. Further, in the latter patent the folding wingtip is principally a movable control surface which is connected either as an aileron or as an airbrake. The invention disclosed hereinafter comprises a large outer wing portion rotated to and locked in the vertical position for high speed flight and obviously is entirely different from the above conventional aircraft folding wings.

Briefly, the invention, which is designed particularly for aircraft having light, thin wings, comprises an improved aircraft wing having a substantial outer portion thereof hingedly connected to the inner or fixed portion of the wing on a canted hinge axis for rotational movement between an extended horizontal position of high lift for ordinary aircraft operation and a folded or vertical position for producing greatly decreased wing bending moments and structural bending loads at the wing root for operation of the aircraft in violent maneuvers under high gravitational loads. In the disclosed sweptback wing, the canted hinge axis is toed out from the wing chord an amount equal to the zero lift angle such that when the outer wing portion is folded to the vertical position this wing portion is in the zero lift position. The wing includes further an additional feature comprising a streamlined fairing pod mounted on the thin wing at the hinge axis which incloses the hinge mechanism, the wing folding motor, and the releasable wing position locking mechanism for maintaining the outer wing portion in either the extended or folded position. In operation such as in, but not limited to, military aircraft, the foldable thin wings are maintained extended for takeoffs, landings, cruising at supersonic speeds, and normal maneuvers imposing less than 3 "g" forces, for example, on the aircraft. When combat flying and violent maneuvers, i.e., those maneuvers involving 3 "g" forces or over, are anticipated, the outer portions of the wings are immediately folded to vertical minimum drag and zero lift position whereby the effective spanwise center of lift of each wing is moved inwardly toward the fuselage to reduce the bending moments and loads at the wing roots.

The drawings diagrammatically illustrate by way of example, not by way of limitation, two forms of the invention wherein like reference numerals designate corresponding parts in the several views in which:

Fig. 2 is a partially cutaway plan view of a portion of the wing showing the hinge connection, the wing folding mechanism, and the wing position locking mechanism all enclosed in the streamlined pod;

Fig. 3 is an end view of the thin wing with the wing-tip removed and a part of the pod cutaway showing the wing folding mechanism and hinge connection with a modified locking mechanism;

Fig. 4 is a sectional view taken at 4—4 on Fig. 2;

Fig. 5 is a sectional view similar to Fig. 4 showing the positions of the wing fold motor after folding the wing;

Fig. 6 is a sectional view taken at 6—6 on Fig. 2;

Fig. 7 is a sectional view taken at 7—7 on Fig. 2;

Fig. 8 is a sectional view similar to Fig. 7 showing a modified locking mechanism in wing extended position;

Fig. 9 is a sectional view taken at 9—9 on Fig. 2;

Fig. 10 is a sectional view similar to Fig. 7 showing the outer wing portion folded to vertical position;

Fig. 11 is a sectional view similar to Fig. 10 showing the modified locking mechanism in wing folded position; and Fig. 12 is a sectional view taken at 12—12 on Fig. 2 with the segmented fairing surface removed showing the frame detail of the pod.

Figure 1:
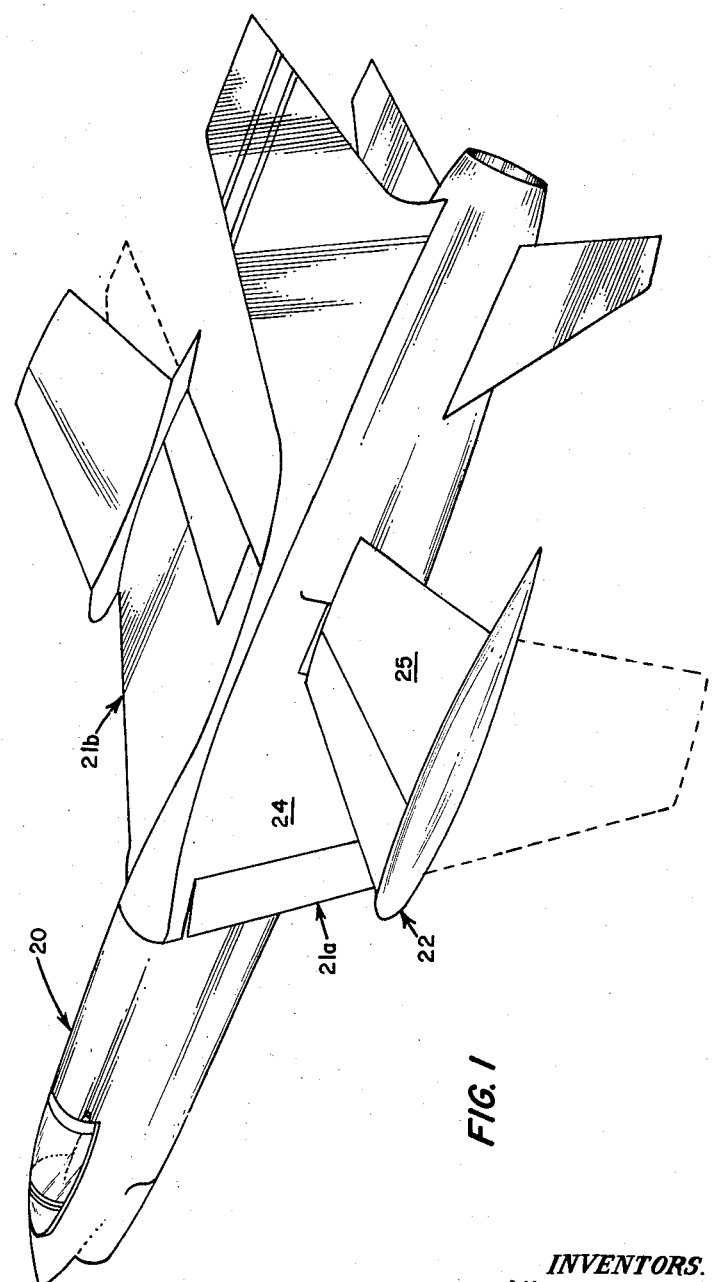
Fig. 1 is a perspective view of an aircraft utilizing the invention wherein the thin outer wing portions are shown in solid lines as being folded to vertical position and shown in broken lines as being in the extended horizontal position.

The invention disclosed herein is not limited in its application to the details of construction and arrangement of parts illustrated in the accompanying drawings, since the invention is capable of other embodiments and of being practiced or carried out in various other ways. Also it is to be understood that the phraseology or terminology employed herein is for the purpose of description and not of limitation.

The term "aircraft," for example, also includes guided missiles, or the like.

While the invention is shown illustrated on a typical military fighter aircraft 20, Fig. 1, wherein the new, improved, and highly efficient wings 21a and 21b, which are foldable to small wings for reducing the bending moments at the wing roots for rapid maneuvering that involves high wing bending moments and loads, these new wings may be utilized on other types of aircraft requiring high strength thin wings. Since the disclosed invention is incorporated in each of the aircraft wings making each a new and improved wing similar to the other, a detailed description of only one new wing is deemed necessary for brevity and clarity of disclosure.

In the partially cutaway plan view of a portion of the new thin wing at the hinge connection, Fig. 2, the principal portion of a streamlined protective envelope or pod 22 is illustrated including a hinge mechanism 23 for connecting the inner portion 24 of the wing 21a to the outer portion 25 of the same wing, a wing folding motor 26 for rotating the outer wing portion about the inner wing portion between an extended horizontal position and a vertical folded position, and a releasable wing position locking mechanism 27 for maintaining the outer wing in either one of the above mentioned positions.

Canted hinge axis

As illustrated in the swept-back wing of Fig. 2, the hinge axis 28 is toed out, askewed, or canted from the wing chord 29, i.e., with the wing chord being parallel to the aircraft longitudinal axis, the hinge axis in the left wing 21a extends forwardly and outwardly or farther to the left from the longitudinal axis. The angle that the hinge axis is canted horizontally from the wing chord with negligible incidence, is substantially equal to the zero lift angle i.e., the angle between the chord of the particular airfoil and the line of the relative wind direction that produces zero lift from the airfoil. While the drawings illustrate the hinge axis being canted approximately 5° away from the wing chord, this angle may be varied, depending on the angle of zero lift and angle of incidence of the particular airfoil being utilized. Likewise, in locating the above-described canted hinge axis of a wing portion having an appreciable angle of incidence that requires consideration and accounting for, this angle of incidence must be added to the zero lift angle, particularly as would be required with wings having a symmetrical airfoil. While no dihedral is illustrated on either wing portion of each wing, obviously it may be added to either or both portions and the wing folding motor so operated as to rotate the outer wing portion to vertical or substantially vertical position. The outer wing portion forms a horizontal extension of the inner wing portion in providing additional lift for all aircraft operations except rapid or violent maneuvers that impose high wing bending moments and loads at the wing root, and when folded to the vertical position, the outer wing portion is substantially in its minimum drag position, i.e., zero lift attitude of the airfoil. This feature is very important as a low drag is desired and is accordingly produced. This feature is exactly contrary to and the opposite from the movable wing tip control surfaces of the tailless airplane shown in U.S. Patent No. 2,418,301 mentioned above which are designed to produce a drag or sidewise forces for purposes of control.

With the outer wing portion folded to vertical position of zero lift and reduced drag, the inner wing portion provides all lift. Because the resulting effective spanwise center of lift from the total wing with the outer portion in horizontal position moves inwardly spanwise toward the wing root when the outer wing portion is folded to zero lift position, the bending moments and resulting structural loads at the wing root are greatly reduced. Accordingly when it is necessary to enter into any rapid and violent maneuvers which would impose undue loads and strains on the wing roots, as in military aircraft for example, the wings are quickly folded and the maneuvers commenced.

While the inner wing portion 24 may be described and claimed as being rigidly secured to the fuselage, obviously, if so desired, this wing portion may be hingedly secured to the fuselage at the wing root for only ground or aircraft carrier operation and yet be maintained in locked, fixed, or rigid relation to the fuselage during flight.

Wing folding motor

The wing folding mechanism comprises the hydraulic, actuated wing folding motor 26 or the like, Figs. 2, 3, and 4, mounted at the wing hinge line and including a piston and piston rod 30 pivotally connected to a clevis 31 on the outer end of the inner wing portion 24 and a hydraulic actuating cylinder 32 pivotally connected to two clevises 33a and 33b on the inner end of the outer wing portion 25 through two scissor linkages 34a, 35a, and 34b, 35b. Scissor link 35a, Fig. 4, which is pivotally connected at its outer end to the outer wing portion clevis 33a, as well as scissor link 35b which is pivotally connected to its clevis 33b, both support the hydraulic cylinder through studs 36a and 36b projecting from opposite sides of the cylinder into pivot holes in the spaced apart scissor links 35a and 35b, respectively. The two links of each pair of scissor linkages per se are pivotally interconnected with pins 37a and 37b, respectively, and the scissor links, 34a or 34b of each pair is pivotally connected to its respective clevis 38a or 38b on the inner wing portion. Accordingly with expansion of the hydraulic motor 26, the outer wing portion 25 is moved to extended position shown in Fig. 4 and upon contraction of the motor, i.e., retraction of the piston rod 30 into the hydraulic actuating cylinder 32 the outer wing portion is rotated to a vertical or wing folded position as illustrated in Fig. 5 due to closure of the scissor linkages. While the wings of present day supersonic aircraft are too thin to accommodate the conventional wing folding motor, particularly one that is actuated during flight, the instant invention alleviates this disadvantage and accordingly a large piston area is available when the largest forces are required, unfolding the wing to extended position.

Hinge mechanism

Hinge mechanism 23 consists of at least two hinge connections, one on each side of the hydraulic actuated wing folding motor 26 as viewed in Fig. 2. While only the aft hinge connection is described in detail, obviously the forward hinge connection is similar thereto. Figs. 6 and 9 are sectional views of the two parts of the aft hinge connection as viewed forwardly and rearwardly, respectively.

The inner end of a hinge pin 39 on the canted hinge axis 28 pivotally connects ear 40a which is an extension of the inner wing portion 24, to bifurcated ear 41a, an extension of outer wing portion 25. Similarly, the rearward end of hinge pin 39 pivotally connects inner wing portion ear 40b to outer wing portion bifurcated ear 41b. As illustrated in Fig. 9, the hinge pin is supported by a brace 42, or the like suitable supporting structure, and secured to the streamlined pod fastened to the inner wing portion. Also as shown in Fig. 2 the hinge axis on which is aligned the hinge pin 39 of the aft hinge connection and the pin of the forward hinge connection is canted outwardly at an angle to the wing chord for rotation of the outer wing portion to zero lift and minimum drag position.

While the hinge connection may be placed at various spanwise locations on the wing, it must be positioned substantially at the mid point location of the wing span or preferably farther inwardly to obtain the maximum advantage from the invention. In a wing having parallel leading and trailing edges and having the hinge at the span midpoint location for example, the wing structure bending moments are reduced a substantial amount, i.e., when the wing is folded the bending moment at the wing root is reduced by approximately 50% and bending moments in the folded panel are negligible.

Wing locking mechanism

The outer wing portion is locked to the inner wing portion in either the extended position, Fig. 7, or in the folded position, Fig. 10, by two like locking toggle linkages, one aft of the folding motor 26 and one forward of the motor. Since the two overcenter locking toggle linkages are similar, only the aft linkage is explained in detail.

Two main free toggle links 43 and 44, Figs. 7 and 10, which are pivotally interconnected with pin 45, pivotally connect the inner wing portion 24, through the pin 46 therein, to the outer wing portion 25 through the clevis 47 thereon. Toggle link 43 consists of two like parts, link 43a and link 43b, Fig. 2. An actuating mechanism spring biased by a tension spring 48, Fig. 2, between a lock release bar 49 and the outer wing portion structure is provided for maintaining or locking the toggle links substantially straight or collinear. This actuating mechanism comprises the lock release bar 49, Fig. 2, operated by any suitable motor (not shown) for ensuring equal movement to both forward and aft toggle linkages through similar bellcranks 50a and 50b pivoted to the outer wing portion with pins 51a and 51b, respectively. An actuating rod 52 is pivotally connected at one end to the bellcrank 50a with a pin 53 and at the other end to a second set of toggle links 54 and 55 with a common interconnecting pin 56. Link 55 of the second set of toggle links is actually two allochiral links 55a and 55b, Figs. 2 and 7, respectively, at each end of pin 56. Link 54 is pivotally connected at its other end to hinge pin 39 and links 55a and 55b are pivotally connected at their other ends to the main toggle links interconnecting pin 45.

In operation of the locking mechanism and during folding of the outer wing portion 25 about the inner wing portion 24, lock release bar 49 is operated forwardly or to the left in Fig. 2, which through operation of the bellcranks 50a and 50b against the action of spring 48, and operation of the actuating rod 52, second toggle links 54 and 55, Fig. 7, are unlocked to accordingly unlock the first toggle links 43 and 44. When the outer wing portion reaches folded position, Fig. 10, the lock actuating mechanism due to its spring action, snaps and spring biases the second set of toggle links 54, 55 to substantially straightened or collinear position again to lock the main set of toggle links 43 and 44 in a collapsed or folded position for locking the wing portions in folded position.

For extending or unfolding the wing portions, lock release bar 49 is again operated to the left, Fig. 2, to break the second set of toggle links to release the collapsed main toggle link to unlock the folded wing portions for their movement to extended position. When the wing portions reach fully extended position the lock actuating mechanism again snaps the main toggle links out to their collinear position to maintain the wing locked in extended position. It may be noted that the lock release bar 49 can return to its right spring-biased position only when the wing is in one of its two extreme positions, either completely extended to horizontal position or completely folded to vertical position.

Modified wing locking mechanism

Figs. 3, 8, and 11 disclose a modified wing and different wing locking mechanism for an aircraft. This locking mechanism comprises two wing lock motors 57a and 57b, or the like, located on either side of the wing folding motor within the streamlined pod 22 for control of the main toggle links for locking of the wing in either extended or folded position. While hydraulic motors are the preferred type of locking motors, obviously jackscrew, electric, or the like type of motors may be utilized. A hydraulic motor is provided for each pair of main toggle links, i.e., motor 57a operates main toggle links 43 and 44. Conventional sequence valves (not shown) in the wing hydraulic system provide the necessary co-ordination between lock operation and wing fold actuation, i.e., actuation of the locking motors 57a and 57b prior to actuation of the wing folding motor 26. In this embodiment the outer wing portion has a lug 58, Figs. 8 and 11, protruding into the pod envelope 22 for pivotally supporting the locking motor 57a with pin 59 and supporting a bellcrank 60 with pin 61, the outer end of piston rod 62 of the motor 57a being pivotally connected to an end of the bellcrank with pin 63.

In operation of the modified wing locking mechanism, retraction of the locking motor 57a, Fig. 8, breaks the second toggle formed by link 55b and bellcrank 60 to free main toggle links 43 and 44 thus permitting folding of the outer wing portion by actuation of the wing fold motor as controlled by the conventional sequence valve (not shown). When the outer wing portion reaches substantially vertical or folded position, Fig. 11, the piston rod 62 is actuated to move the second toggle linkage 55b, 60 to collinear position to lock the main toggle linkage 43, 44 and the wing portions in folded position. Likewise for extending the folded wing the procedure is reversed, wherein the locking motor 57a is operated to unlock the wing from folded position, the wing folding motor is expanded to spread the wing to extended position, and the locking motor is operated to lock the wing in extended position.

Accordingly in both embodiments with stopping of the locking motor as the second toggle linkage becomes collinear in each of the wing folded and wing extended positions, the main toggle linkage is maintained in each of the collapsed and collinear positions, respectively, to accordingly lock the wings in folded and extended positions, respectively.

Pod

One of the features of major importance in contributing to the success of this invention is the streamlined torpedo shaped protective envelope or pod 22 mounted on the thin wing concentric with the hinge axis 28 and including the wing fold motor, the hinge mechanism, and the wing locking mechanism. While the pod may be of any desired high speed streamline shape, a preferred embodiment for supersonic flight is a long cylindrical body having a fineness ratio as high as structurally practical having ogival front and rear sections, and a similar shape for an embodiment designed for subsonic flight but with the addition of a blunt nose on the ogival front section. The upper skin surface of the pod over the hinge wing fold motor and locks comprises a segmented fairing skin 64, Fig. 9, with collector housing 65 for nestling the skin segments 64 when the wing is folded. A similar portion 66, of the lower skin surface is lapped with an arcuate plate 67, Fig. 5, both concentric and contiguous with the adjacent edges of the pod skin at the pod ends and movable with the outer wing portion for always maintaining a smooth cylindrical pod envelope, whether the wing is folded, extended, or in an intermediate position in the process of moving from one position to the other. Fig. 12, a sectional view of the aft portion of the pod shows a typical frame comprising ribs 68 and stringers 69 that may be utilized in both the forward and aft end sections of the pod, both sections being fixedly secured to the inner wing portion as the outer wing portion rotates thereover.

In summary, a new, light, and efficient high speed thin wing has been disclosed for aircraft requiring light and/or thin wings wherein the wings are folded in flight for reduction of structural bending moments and loads at the wing roots to permit high maneuverability of the aircraft. A light weight wing structure is provided which, with the wings extended to maximum wing span, is highly efficient for take-offs, cruising, and landings, and the same wing structure, with the outer wing portions folded in flight, provides a small wing span minimizing wing bending moments and permitting aerodynamically efficient design of the thin wing structure for high speed maneuvering of the aircraft, i.e., maneuvers involving greater than 3 "g" forces. With the hinge axis canted, the outer wing portion of each wing may be folded to the vertical position of zero lift. Two different fool proof quick-actuating locking mechanisms are provided for locking the wing portions in each of the extended and folded positions. Enveloping the hinge mechanism, locking mechanism, and wing folding motor is the streamlined protective pod that maintains an efficient cylindrical fairing for all positions of the wing.

While only two embodiments of the invention have been shown in the accompanying drawings, it will be evident that various modifications are possible in the arrangement and construction of the high speed aircraft wing having folding and locking mechanisms without departing from the scope of the invention.

We claim:

1. An aircraft wing fold system for operation during flight comprising, a wing having outer and inner wing portions, said outer wing portion hingedly connected to said inner wing portion with a hinge pin, said outer wing portion being adapted to be rotated during flight between a folded position extending substantially vertically to said inner wing portion and an unfolded position extending substantially spanwise from said inner wing portion, a toggle joint comprising a pair of scissor links connected together with an inner connecting pin, one link of said pair being pivotally connected to said inner wing portion, the other link of said pair being pivotally connected to said outer wing portion whereby said scissor links are collapsed when said wing is folded and said scissor links are in collinear position when said wing is unfolded, and said toggle joint comprising means connected to said pair of scissor links for locking said scissor links in collapsed position when said wing is folded and for locking said scissor links in collinear position when said wing is unfolded.

2. An aircraft wing fold system for operation during flight comprising, a wing having outer and inner wing portions, said outer wing portion hingedly connected to said inner wing portion, said outer wing portion being adapted to be rotated during flight between a folded position extending substantially vertically to said inner wing portion and an unfolded position extending substantially spanwise from said inner wing portion, said hinge connection comprising a hinge pin fixedly mounted on one of said wing portions, a toggle joint comprising a pair of scissor links, one link of said pair being pivotally connected to said inner wing portion, the other link of said pair being pivotally connected to said outer wing portion whereby said scissor links are collapsed when said wing is folded and said scissor links are in collinear position when said wing is unfolded, and said toggle joint comprising means connected between said hinge pin and said pair of scissor links for locking said scissor links in collapsed position when said wing is folded and for locking said scissor links in collinear position when said wing is unfolded.

3. An aircraft wing fold system for operation during flight comprising a wing having outer and inner wing portions, said outer wing portion hingedly connected on a hinge axis to said inner wing portion for rotation between a folded position extending substantially vertically to said inner wing portion and an unfolded position extending substantially spanwise from said inner wing portion, motor means for folding and unfolding said wing during flight, said hinge connection having a hinge pin collinear with said hinge axis and fixedly mounted on said inner wing portion, a toggle joint comprising first and second pairs of scissor links, each pair having an interconnecting pin, one link of said first pair being pivotally connected to said inner wing portion, the other link of said first pair being pivotally connected to said outer wing portion whereby said first pair of links are folded when the wing is folded and substantially collinear and spaced above said hinge pin when said wing is unfolded, one link of said second pair of scissor links being pivotally connected to the interconnecting pin of said first pair, the other link of said second pair being pivotally connected to said hinge pin, and actuating means for operating said two pair of scissor links for locking said wing in folded position, said actuating means being operable further for locking said wing in unfolded position.

4. An aircraft wing fold system for operation during flight as recited in claim 1 wherein said locking means comprises a second pair of scissors links and a spring biased linkage means, one link of said second pair of scissor links being pivotally connected to the interconnecting pin of said first pair, the other link of said second pair being pivotally connected to said hinge pin, and spring biased linkage means for folding and straightening said second pair of links for locking said wing in folded position, said linkage means being operable further for locking said wing in unfolded position.

5. An aircraft wing fold system for operation during flight as recited in claim 1 wherein said locking means comprises a second pair of scissor links and a motor means, one link of said second pair of scissor links being pivotally connected to the interconnecting pin of said first pair, the other link of said second pair being pivotally connected to said hinge pin, and motor means for folding and straightening said second pair of links for locking said wing in folded position, said motor means being operable further for locking said wing in unfolded position.

References Cited in the file of this patent

UNITED STATES PATENTS

| | | |
|---|---|---|
| 2,289,224 | Swanson et al. | July 7, 1942 |
| 2,397,526 | Bonbright | Apr. 2, 1946 |
| 2,719,682 | Handel | Oct. 4, 1955 |

FOREIGN PATENTS

| | | |
|---|---|---|
| 888,367 | Germany | Aug. 31, 1953 |